(12) United States Patent
Wakita et al.

(10) Patent No.: US 6,763,331 B2
(45) Date of Patent: Jul. 13, 2004

(54) SENTENCE RECOGNITION APPARATUS, SENTENCE RECOGNITION METHOD, PROGRAM, AND MEDIUM

(75) Inventors: Yumi Wakita, Nara (JP); Kenji Matsui, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/240,446
(22) PCT Filed: Jan. 31, 2002
(86) PCT No.: PCT/JP02/00746
§ 371 (c)(1),
(2), (4) Date: Apr. 9, 2003
(87) PCT Pub. No.: WO02/061728
PCT Pub. Date: Aug. 8, 2002

(65) Prior Publication Data
US 2003/0204396 A1 Oct. 30, 2003

(30) Foreign Application Priority Data
Feb. 1, 2001 (JP) .......................................... 2001-25209

(51) Int. Cl.$^7$ .............................................. G10L 15/04
(52) U.S. Cl. ...................................................... 704/251
(58) Field of Search ................................ 704/231, 233, 704/236, 246, 251–257, 270, 275

(56) References Cited

U.S. PATENT DOCUMENTS 4,882,757 A * 11/1989 Fisher et al. ................. 704/251
5,577,164 A * 11/1996 Kaneko et al. .............. 704/275

FOREIGN PATENT DOCUMENTS

| JP | 2000-29492 | 1/2000 |
| JP | 2000-172294 | 6/2000 |

OTHER PUBLICATIONS

T. Jitsuhiro et al., "Rejection by Confidence Measure Based on Likelihood Difference Between Competing Phonemes", Technical Report of IEICE, SP 97–76, pp. 1–7 (1997).
Japanese International Search Report for PCT/JP02/00746, dated Apr. 23, 2002.
English translation of Japanese International Search Report for PCT/JP02/00746, dated Apr. 23, 2002.
Sato et al., "Recovery from Errors in Sentences Using Word Co-occurrence Relationship of Character Strings", The Institute Of Electronics, Information and Communication Engineers, Oct. 16, 1992, NLC92–33, pp. 17–22, with English abstract.
Wakita et al., "Correct parts extraction from speech recognition results using semantic distance calculation, and its application to speech translation", Information Processing Society of Japan, Jul. 18, 1997, pp. 19–26, with English abstract and translation.

(List continued on next page.)

Primary Examiner—David D. Knepper
(74) Attorney, Agent, or Firm—RatnerPrestia

(57) ABSTRACT

In the prior art, it has been difficult to perform proper sentence recognition by using speech recognition or text sentence recognition. The present invention provides a sentence recognition apparatus comprising: a data base for storing a plurality of predetermined standard content word pairs each formed from a plurality of predetermined content words; a speech recognition means of recognizing an input sentence made up of a plurality of words; a content word selection means of selecting content words from among the plurality of words forming the recognized sentence; a judging means of judging whether a content word pair arbitrarily formed from the selected content words matches any one of the standard content word pairs stored in the data base; and an erroneously recognized content word determining means 105 of determining, based on the result of the judgement, an erroneously recognized content word for which the recognition failed from among the selected content words.

26 Claims, 10 Drawing Sheets

OTHER PUBLICATIONS

Tsuboi et al., "Linguistic Processing for Continuous Speech Recognition Using Frequent Co-occurrence Patterns", NTT Human Interface Laboratories, Oct. 4, 1990, pp. 89–90.

Tatsuro Itoh, et al., "An Improvement in Semantic Constraint for Spoken Japanese Sentence Recognition", Matsushita Research Institute Tokyo, Inc., Oct. 4, 1990, pp. 91–92.

* cited by examiner

Fig. 4

| STANDARD CONTENT WORD PAIRS |
|---|
| (熱い, コーヒー), (コーヒー, 飲む)....<br>"(atsui, koohii), (koohii, nomu)",... |

Fig. 5(a)

| INPUT SENTENCE | 熱いコーヒーを飲みますか。<br>"Atsui koohii wo nomi masu ka?" | | | | | |
|---|---|---|---|---|---|---|
| RECOGNIZED SENTENCE | 青いコーヒーを飲みますか。<br>"Aoi koohii wo nomi masu ka?" | | | | | |
| RECOGNIZED SENTENCE (SEGMENTED INTO WORDS) | 青い<br>"aoi" | コーヒー<br>"koohii" | を<br>"wo" | 飲む<br>"nomu" | ます<br>"masu" | か<br>"ka" |
| CONTENT WORD? | ○ | ○ | × | ○ | × | × |

Fig. 5(b)

| ARBITRARILY FORMED CONTENT WORD PAIRS | (青い、コーヒー)<br>"(aoi, koohii)" | (青い、飲む)<br>"(aoi, nomu)" | (コーヒー、飲む)<br>"(koohii, nomu)" |
|---|---|---|---|
| STANDARD CONTENT WORD PAIR? | × | × | ○ |

Fig. 8 (a)

| CONTENT WORD CLASS (MEANING CODE) | CONTENT WORD |
|---|---|
| 90 | ビル、．．．．<br>"biru",… |
| 100 | コーヒー、ビール、．．．．<br>"koohii, biiru",… |
| 200 | 地元、熱い、．．．．<br>"jimoto, atsui",… |
| 300 | 飲む、．．．．<br>"nomu",… |
| 400 | 呼ぶ、．．．．<br>"yobu",… |

Fig. 8 (b)

| STANDARD CONTENT WORD CLASS PAIRS |
|---|
| (100,200),(100,300),… |

Fig. 9(a)

| INPUT SENTENCE | 地元のビールを飲みますか。"Jimoto no biiru wo nomi masu ka?" | | | | | | |
|---|---|---|---|---|---|---|---|
| RECOGNIZED SENTENCE | 地元のビールを呼びますか。"Jimoto no biiru wo yobi masu ka?" | | | | | | |
| RECOGNIZED SENTENCE (SEGMENTED INTO WORDS) | 地元 "jimoto" | の "no" | ビール "biiru" | を "wo" | 呼ぶ "yobu" | ます "masu" | か "ka" |
| CONTENT WORD? | ○ | × | ○ | × | ○ | × | × |
| CONTENT WORD CLASS | 200 | — | 100 | — | 400 | — | — |

Fig. 9(b)

| ARBITRARILY FORMED CONTENT WORD CLASS PAIRS | (100, 200) | (100, 400) | (200, 400) |
|---|---|---|---|
| STANDARD CONTENT WORD CLASS PAIR? | ○ | × | × |

SENTENCE RECOGNITION APPARATUS, SENTENCE RECOGNITION METHOD, PROGRAM, AND MEDIUM

TECHNICAL FIELD

The present invention relates to a sentence recognition apparatus that uses, for example, speech recognition or text sentence recognition, a sentence recognition method, a program, and a medium.

BACKGROUND ART

The prior art will be described by taking a speech recognition means as an example.

In a speech recognition means, if an error occurs due to incomplete recognition, and the result is output without correcting the error, that will present a serious problem in practical implementation.

To solve this problem, the prior art proposes a method in which if the recognition score of the first candidate in the recognition result is not greater by more than a predetermined value than the recognition score of the second or later candidate, it is then determined that the confidence of the recognition result is low. The sentence produced as the recognition result is rejected or a re-entry is requested.

This example will be described in further detail with reference to an example that uses a one-pass, n-best search which is a typical search means employed, for example, in a continuous speech recognition means.

The acoustic feature of each phoneme is extracted in advance by using a training speech DB, and the probability of connection between words each represented by a string of phonemes is also computed in advance by using a text DB. When performing recognition, the acoustic feature of input speech per unit time is analyzed, and the amount of the feature, in the form of a time series, is compared with the amount of the pre-learned acoustic feature of each phoneme, to compute an acoustic score which represents the probability that the input voice at each instant in time is a phoneme.

Acoustic scores are summed in time series in accordance with the string of phonemes in each word carried in a word dictionary, and the sum is the acoustic score at each instant in time. If a search space for all the phoneme strings cannot be secured, the process proceeds while leaving only N best results ranked in order of decreasing score.

If the input voice contains a plurality of words, the words are connected by referring to the pre-learned word connection probability and, when connected, the word connection probability (called the language score) is added to the acoustic score.

When the recognition scores of the N best candidates are thus computed, if the difference between the first candidate and the second candidate is not larger than a predetermined value, it is determined that the confidence of the result of the first candidate is low, and the result is rejected (for example, Jitsuhiro et al., "Rejection by Confidence Measure Based on Likelihood Difference Between Competing Phonemes", Technical Report of IEICE, SP 97–76, pp. 1–7 (1997)).

However, the above recognition score indicates the similarity between the input voice and the pre-learned acoustic model or language model, and the reality is that the value varies greatly, depending on the speaker or on how the voice is uttered, even if correct recognition is done. It is therefore extremely difficult to determine the score ratio threshold for rejection, and this has often resulted in the rejection of a correct recognition result or the output of an incorrect recognition result by erroneously judging it to be a correct recognition result.

As a result, it has been difficult to perform proper sentence recognition by using speech recognition or text sentence recognition.

DISCLOSURE OF THE INVENTION

In view of the above-described problem of the prior art, it is an object of the present invention to provide a sentence recognition apparatus, a sentence recognition method, a program, and a medium, that can perform proper sentence recognition by using speech recognition or text sentence recognition.

One aspect of the present invention is a sentence recognition apparatus comprising:
  a data base for storing a plurality of predetermined standard specific word pairs each formed from a plurality of predetermined specific words;
  sentence recognition means of recognizing an input sentence made up of a plurality of words;
  specific word selection means of selecting said specific words from among the plurality of words forming said recognized sentence;
  judging means of judging whether a specific word pair arbitrarily formed from said selected specific words matches any one of the standard specific word pairs stored in said data base; and
  erroneously recognized specific word determining means of determining, based on the result of said judgement, an erroneously recognized specific word for which said recognition failed from among said selected specific words.

Another aspect of the present invention is a sentence recognition apparatus, wherein said erroneously recognized specific word determining means determines a specific word as being said erroneously recognized specific word if said specific word is found in more than a predetermined number of arbitrarily formed specific word pairs that have been judged as not matching any of the standard specific word pairs stored in said data base.

Still another aspect of the present invention is a sentence recognition apparatus, further comprising re-entry requesting means of requesting, in the event of occurrence of said erroneously recognized specific word, (1) a re-entry of the specific word corresponding to said erroneously recognized specific word or (2) a re-entry of said input sentence.

Yet still another aspect of the present invention is a sentence recognition apparatus, further comprising notifying means of notifying a user of the occurrence of said erroneously recognized specific word when said erroneously recognized specific word does occur.

Still yet another aspect of the present invention is a sentence recognition apparatus comprising:
  a data base for storing a plurality of predetermined standard specific word pairs each formed from a plurality of predetermined specific words;
  sentence recognition means of recognizing an input sentence made up of a plurality of words;
  specific word selection means of selecting said specific words from among the plurality of words forming said recognized sentence;
  judging means of judging whether a specific word pair arbitrarily formed from said selected specific words matches any one of the standard specific word pairs stored in said data base; and sentence erroneous recognition determining means of determining, based on the result of said judgement, whether said input sentence has been erroneously recognized or not.

A further aspect of the present invention is a sentence recognition apparatus, further comprising sentence re-entry requesting means of requesting a re-entry of said input sentence in the event of occurrence of said erroneous recognition.

A still further aspect of the present invention is a sentence recognition apparatus, further comprising notifying means of notifying a user of the occurrence of said erroneous recognition when said erroneous recognition does occur.

A yet further aspect of the present invention is a sentence recognition apparatus comprising:

a first data base for storing correspondences between a plurality of predetermined specific words and a plurality of specific word classes to which said specific words belong;

a second data base for storing a plurality of predetermined standard specific word class pairs each formed from two of said predetermined specific word classes;

sentence recognition means of recognizing an input sentence made up of a plurality of words;

specific word selection means of selecting said specific words from among the plurality of words forming said recognized sentence;

specific word class determining means of determining, by utilizing the correspondences stored in said first data base, the specific word classes to which said selected specific words respectively belong;

judging means of judging whether a specific word class pair arbitrarily formed from said determined specific word classes matches any one of the standard specific word class pairs stored in said second data base; and erroneously recognized specific word determining means of determining, based on the result of said judgement, an erroneously recognized specific word for which said recognition failed from among said selected specific words.

A still yet further aspect of the present invention is a sentence recognition apparatus, wherein said erroneously recognized specific word determining means determines a specific word as being said erroneously recognized specific word if the specific word class to which said specific word belongs is found in more than a predetermined number of arbitrarily formed specific word class pairs that have been judged as not matching any of the standard specific word class pairs stored in said second data base.

An additional aspect of the present invention is a sentence recognition apparatus, further comprising re-entry requesting means of requesting, in the event of occurrence of said erroneously recognized specific word, (1) a re-entry of the specific word corresponding to said erroneously recognized specific word or (2) a re-entry of said input sentence.

A still additional aspect of the present invention is a sentence recognition apparatus, further comprising notifying means of notifying a user of the occurrence of said erroneously recognized specific word when said erroneously recognized specific word does occur.

A yet additional aspect of the present invention is a sentence recognition apparatus comprising:

a first data base for storing correspondences between a plurality of predetermined specific words and a plurality of specific word classes to which said specific words belong;

a second data base for storing a plurality of predetermined standard specific word class pairs each formed from two of said predetermined specific word classes;

sentence recognition means of recognizing an input sentence made up of a plurality of words;

specific word selection means of selecting said specific words from among the plurality of words forming said recognized sentence;

specific word class determining means of determining, by utilizing the correspondences stored in said first data base, the specific word classes to which said selected specific words respectively belong;

judging means of judging whether a specific word class pair arbitrarily formed from said determined specific word classes matches any one of the standard specific word class pairs stored in said second data base; and sentence erroneous recognition determining means of determining, based on the result of said judgement, whether said input sentence has been erroneously recognized or not.

A still yet additional aspect of the present invention is a sentence recognition apparatus, further comprising sentence re-entry requesting means of requesting a re-entry of said input sentence in the event of occurrence of said erroneous recognition.

A supplementary aspect of the present invention is a sentence recognition apparatus, further comprising notifying means of notifying a user of the occurrence of said erroneous recognition when said erroneous recognition does occur.

A still supplementary aspect of the present invention is a sentence recognition method comprising:

a storing step of storing in a data base a plurality of predetermined standard specific word pairs each formed from a plurality of predetermined specific words;

a sentence recognition step of recognizing an input sentence made up of a plurality of words;

a specific word selection step of selecting said specific words from among the plurality of words forming said recognized sentence;

a judging step of judging whether a specific word pair arbitrarily formed from said selected specific words matches any one of the standard specific word pairs stored in said data base; and an erroneously recognized specific word determining step of determining, based on the result of said judgement, an erroneously recognized specific word for which said recognition failed from among said selected specific words.

A yet supplementary aspect of the present invention is a sentence recognition method comprising:

a storing step of storing in a data base a plurality of predetermined standard specific word pairs each formed from a plurality of predetermined specific words;

a sentence recognition step of recognizing an input sentence made up of a plurality of words;

a specific word selection step of selecting said specific words from among the plurality of words forming said recognized sentence;

a judging step of judging whether a specific word pair arbitrarily formed from said selected specific words matches any one of the standard specific word pairs stored in said data base; and a sentence erroneous recognition determining step of determining, based on the result of said judgement, whether said input sentence has been erroneously recognized or not.

A still yet supplementary aspect of the present invention is a sentence recognition method comprising:

a first storing step of storing, in a first data base, correspondences between a plurality of predetermined specific words and a plurality of specific word classes to which said specific words belong;

a second storing step of storing in a second data base a plurality of predetermined standard specific word class pairs each formed from two of said predetermined specific word classes;

a sentence recognition step of recognizing an input sentence made up of a plurality of words;

a specific word selection step of selecting said specific words from among the plurality of words forming said recognized sentence;

a specific word class determining step of determining, by utilizing the correspondences stored in said first data base, the specific word classes to which said selected specific words respectively belong;

a judging step of judging whether a specific word class pair arbitrarily formed from said determined specific word classes matches any one of the standard specific word class pairs stored in said second data base; and an erroneously recognized specific word determining step of determining, based on the result of said judgement, an erroneously recognized specific word for which said recognition failed from among said selected specific words.

Another aspect of the present invention is a sentence recognition method comprising:

a first storing step of storing, in a first data base, correspondences between a plurality of predetermined specific words and a plurality of specific word classes to which said specific words belong;

a second storing step of storing in a second data base a plurality of predetermined standard specific word class pairs each formed from two of said predetermined specific word classes;

a sentence recognition step of recognizing an input sentence made up of a plurality of words;

a specific word selection step of selecting said specific words from among the plurality of words forming said recognized sentence;

a specific word class determining step of determining, by utilizing the correspondences stored in said first data base, the specific word classes to which said selected specific words respectively belong;

a judging step of judging whether a specific word class pair arbitrarily formed from said determined specific word classes matches any one of the standard specific word class pairs stored in said second data base; and a sentence erroneous recognition determining step of determining, based on the result of said judgement, whether said input sentence has been erroneously recognized or not.

Still another aspect of the present invention is a program for causing a computer to carry out all or part of the steps in the sentence recognition method, said steps comprising: the storing step of storing in a data base a plurality of predetermined standard specific word pairs each formed from a plurality of predetermined specific words; the sentence recognition step of recognizing an input sentence made up of a plurality of words; the specific word selection step of selecting said specific words from among the plurality of words forming said recognized sentence; the judging step of judging whether a specific word pair arbitrarily formed from said selected specific words matches any one of the standard specific word pairs stored in said data base; and the erroneously recognized specific word determining step of determining, based on the result of said judgement, an erroneously recognized specific word for which said recognition failed from among said selected specific words.

Yet still another aspect of the present invention is a program for causing a computer to carry out all or part of the steps in the sentence recognition method, said steps comprising: the storing step of storing in a data base a plurality of predetermined standard specific word pairs each formed from a plurality of predetermined specific words; the sentence recognition step of recognizing an input sentence made up of a plurality of words; the specific word selection step of selecting said specific words from among the plurality of words forming said recognized sentence; the judging step of judging whether a specific word pair arbitrarily formed from said selected specific words matches any one of the standard specific word pairs stored in said data base; and the sentence erroneous recognition determining step of determining, based on the result of said judgement, whether said input sentence has been erroneously recognized or not.

Still yet another aspect of the present invention is a program for causing a computer to carry out all or part of the steps in the sentence recognition method, said steps comprising: the first storing step of storing, in a first data base, correspondences between a plurality of predetermined specific words and a plurality of specific word classes to which said specific words belong; the second storing step of storing in a second data base a plurality of predetermined standard specific word class pairs each formed from two of said predetermined specific word classes; the sentence recognition step of recognizing an input sentence made up of a plurality of words; the specific word selection step of selecting said specific words from among the plurality of words forming said recognized sentence; the specific word class determining step of determining, by utilizing the correspondences stored in said first data base, the specific word classes to which said selected specific words respectively belong; the judging step of judging whether a specific word class pair arbitrarily formed from said determined specific word classes matches any one of the standard specific word class pairs stored in said second data base; and the erroneously recognized specific word determining step of determining, based on the result of said judgement, an erroneously recognized specific word for which said recognition failed from among said selected specific words.

A further aspect of the present invention is a program for causing a computer to carry out all or part of the steps in the sentence recognition method, said steps comprising: the first storing step of storing, in a first data base, correspondences between a plurality of predetermined specific words and a plurality of specific word classes to which said specific words belong; the second storing step of storing in a second data base a plurality of predetermined standard specific word class pairs each formed from two of said predetermined specific word classes; the sentence recognition step of recognizing an input sentence made up of a plurality of words; the specific word selection step of selecting said specific words from among the plurality of words forming said recognized sentence; the specific word class determining step of determining, by utilizing the correspondences stored in said first data base, the specific word classes to which said selected specific words respectively belong; the judging step of judging whether a specific word class pair arbitrarily formed from said determined specific word classes matches any one of the standard specific word class pairs stored in said second data base; and the sentence erroneous recognition determining step of determining, based on the result of said judgement, whether said input sentence has been erroneously recognized or not.

A still further aspect of the present invention is a medium holding thereon the program, wherein said medium is computer processable.

A yet further aspect of the present invention is a medium holding thereon the program, wherein said medium is computer processable.

A still yet further aspect of the present invention is a medium holding thereon the program, wherein said medium is computer processable.

An additional aspect of the present invention is a medium holding thereon the program, wherein said medium is computer processable.

It will be noted that (1) in a speech recognition means that deduces an erroneously recognized word from the relations between the specific words contained in the recognized sentence and produces an output by reflecting the result of the deduction in the recognized sentence, a result rejecting means or a re-entry requesting means that requests the user for a re-entry when all or many of the words used for the deduction of erroneously recognized words are deduced as being erroneously recognized words, and (2) a result rejecting means or a re-entry requesting means that requests the user for a re-entry when none or few of the words contained in the recognized sentence match pre-learned specific word or word class pairs having dependency or co-occurrence relations between them, are also included in the present invention.

Such a rejecting means comprises, for example, a continuous speech recognition means of recognizing speech comprising a plurality of words, an important word extracting means of extracting specific words from the result of the recognition, a confidence computing means of assessing the confidence of the recognition result by examining the dependency or co-occurrence relations between the extracted words, a rejection determining means of rejecting the result when the result lacks confidence, and an output sentence generating means of generating a re-entry requesting sentence when the result is rejected.

In this rejecting means, specific words are extracted from the recognized sentence, the extracted words are searched through for word pairs having dependency or co-occurrence relations between them, and when none or few of such word pairs are found, the recognition result is rejected, thereby enabling an erroneous result to be rejected consistently even if the speaker or the way the voice is uttered changes.

The result rejecting means or re-entry requesting means that uses word classes determined by using relations between words contained in a commonly used thesaurus dictionary and a training sentence set is also included in the present invention.

Such a rejecting means comprises, for example, a word class determining means of classifying important words, a word class relationship table in which the relationships between word classes are defined, a continuous speech recognition means of recognizing speech comprising a plurality of words, an important word extracting means of extracting specific words from the result of the recognition, a confidence computing means of assessing the confidence of the recognition result by examining the dependency or co-occurrence relations between the extracted words, a rejection determining means of rejecting the result when the result lacks confidence, and an output sentence generating means of generating a re-entry requesting sentence when the result is rejected.

In this rejecting means, words are optimally classified in advance, and the dependency or co-occurrence relations between the word classes are examined and stored in a table. When performing recognition, specific words are extracted from the recognized sentence, the extracted words are searched through for word pairs having dependency or co-occurrence relations between them by using the relationship table in which the dependency or co-occurrence relations are defined, and when none or few of such word pairs are found, the recognition result is rejected, thereby enabling an erroneous result to be rejected consistently even if the speaker or the way the voice is uttered changes. Furthermore, the rejection or the re-entry requesting operation can be performed even when a word not contained in a sentence set used to learn the relationships between words is entered for recognition.

BRIEF DESCRIPTION OF THE DRAWINGS

FIG. 4 is a diagram for explaining the data stored in a data base 101 according to the third embodiment of the present invention.

FIG. 5($a$) is a diagram (part 1) for explaining the operation of the speech recognition apparatus according to the third embodiment of the present invention, and FIG. 5($b$) is a diagram (part 2) for explaining the operation of the speech recognition apparatus according to the third embodiment of the present invention.

FIG. 8($a$) is a diagram for explaining the data stored in a data base 201 according to the fifth embodiment of the present invention, and FIG. 8($b$) is a diagram for explaining the data stored in a data base 202 according to the fifth embodiment of the present invention.

FIG. 9($a$) is a diagram (part 1) for explaining the operation of the speech recognition apparatus according to the fifth embodiment of the present invention, and FIG. 9($b$) is a diagram (part 2) for explaining the operation of the speech recognition apparatus according to the fifth embodiment of the present invention.

DESCRIPTION OF THE REFERENCE NUMERALS

1. TAGGED CORPUS
2. DEPENDENCY ANALYSIS
3. IMPORTANT WORD DEPENDENCY TABLE
4. IMPORTANT WORD DICTIONARY
5. SPEECH RECOGNITION
6. IMPORTANT WORD EXTRACTION
7. ERRONEOUSLY RECOGNIZED WORD DEDUCTION
8. REJECTION DETERMINATION
9. RESULT SENTENCE GENERATION
10. WORD CLASS DETERMINATION
11. IMPORTANT WORD CLASS DEPENDENCY TABLE
12. THESAURUS DICTIONARY

BEST MODE FOR CARRYING OUT THE INVENTION

Embodiments of the present invention will be described below with reference to the accompanying drawings.

(Embodiment 1)

Figure 1:
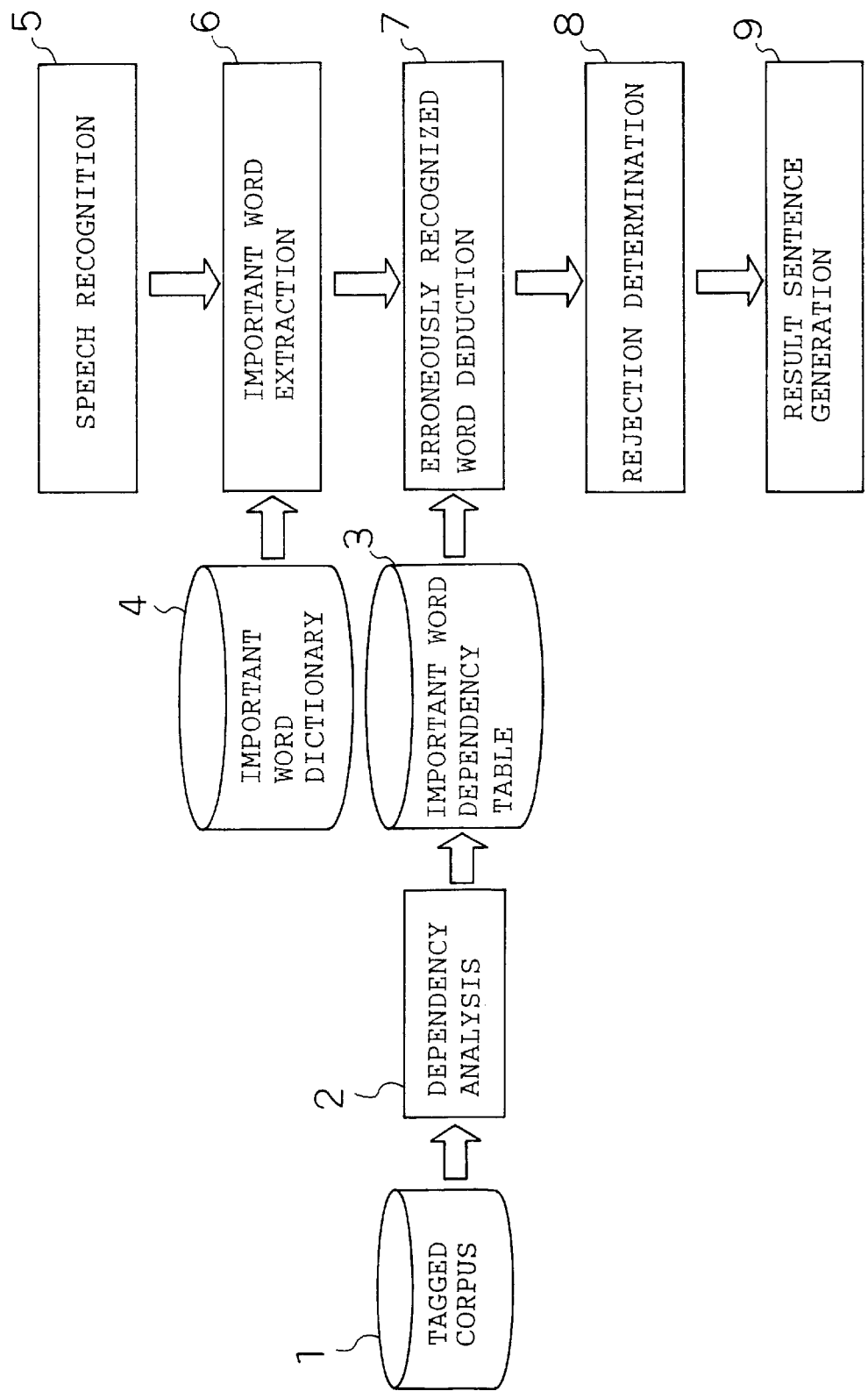
FIG. 1 is a block diagram showing the configuration of a re-entry requesting means according to a first embodiment of the present invention.

First, referring to FIG. 1 which is a block diagram showing the configuration of a re-entry requesting means according to a first embodiment of the present invention, the configuration and operation of the re-entry requesting means according to this embodiment will be described.

The description given hereinafter deals with the case in which a recognition result is rejected by a speech recognition means.

Prior to recognition, dependency structure analysis is performed, using a dependency analysis means, for each phrase contained in a corpus on which morphological analysis is already done (hereinafter called the tagged corpus) and, with the results taken to represent dependencies between the content words contained in each phrase, pairs of words having dependency relations between them are defined in a table. The dependency structure analysis means here can be accomplished by performing syntax analysis between clauses using, for example, a case grammar rule.

When performing recognition, first, input speech is recognized and the recognition result is output as a string of words. In a continuous speech recognition technique using a one-pass, n-best search, for example, the string of words as the result can be output as recognition candidates. Next, only specific words are extracted from the sting of words output as the recognition result. Here, the words necessary to understand the main meaning of the sentence (called the important words) are extracted as the specific words; more specifically, content words may be taken as the specific words. Next, an erroneously recognized word is deduced by examining the relations between the specific words. This is accomplished by examining whether the important words extracted from the recognition result form word pairs having dependency relations between them that match the already analyzed dependency relations, and by determining that an important word that does not form a corresponding word pair with any other important word is an erroneously recognized word. In this process, if all the words are determined as being erroneously recognized words, then it is determined that the confidence of the recognition result is extremely low and the result should therefore be rejected, and a message prompting the speaker for a re-entry is generated and displayed on the screen. The message generated in this case goes like this, "Your voice wasn't clear enough. Please speak once again." If some of the words were not deduced as being erroneously recognized words, then a sentence consisting only of phrases containing the important words determined as being not erroneously recognized is generated and output on the screen. This rejection determining means determines that the result should be rejected when all the words are determined as being erroneously recognized; alternatively, it may be determined that the result should be rejected when the percentage of the erroneously recognized words in the set of important words extracted from the recognition result is higher than a predetermined value, otherwise the recognition result is output.

In this embodiment, the dependency relations between words are extracted in advance and, by comparing the important words contained in the recognition result against the extracted dependency relations, an erroneously recognized word that may be contained in the recognition result is deduced; when all or more than a predetermined percentage of the important words contained in the recognition result are determined as being erroneously recognized words, then the recognition result is rejected and the speaker is prompted for a re-entry, thus enabling an erroneous result to be rejected consistently and a re-entry request to be made in an effective manner even if the speaker or the way the voice is uttered changes.

Accordingly, by deducing erroneously recognized words from the dependency or co-occurrence relations between the important words contained in the recognition result sentence, and by making a re-entry request to the user when many of the words are deduced as being erroneously recognized words, it becomes possible to reject an erroneous result consistently and issue a re-entry request in an effective manner even if the speaker or the way the voice is uttered changes.

(Embodiment 2)

Figure 2:
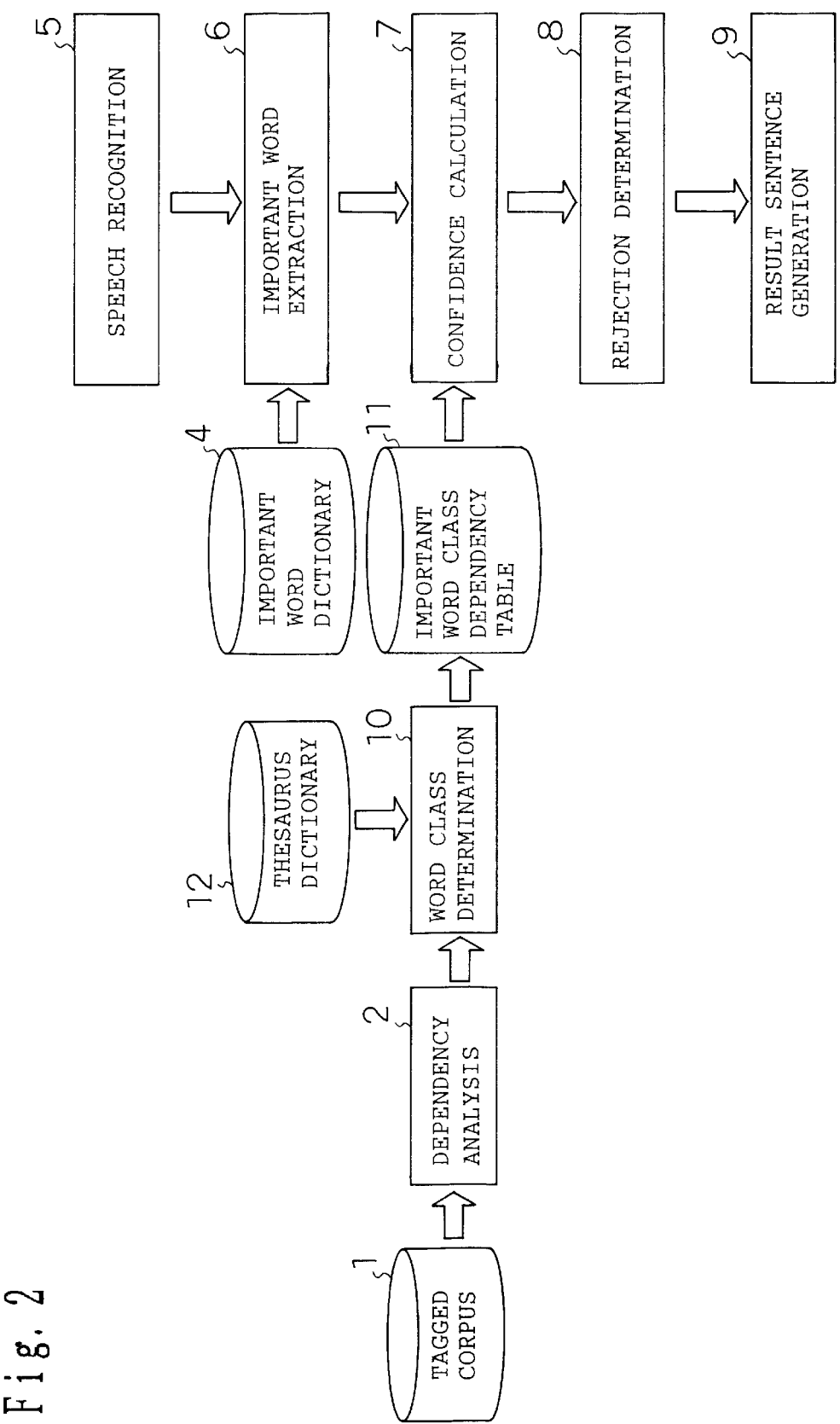
FIG. 2 is a block diagram showing the configuration of a re-entry requesting means according to a second embodiment of the present invention.

First, referring to FIG. 2 which is a block diagram showing the configuration of a re-entry requesting means according to a second embodiment of the present invention, the configuration and operation of the re-entry requesting means according to this embodiment will be described.

The description given hereinafter also deals with the case in which a recognition result is rejected by a speech recognition means.

Prior to recognition, dependency structure analysis is performed, using a dependency analysis means, for each phrase contained in a corpus on which morphological analysis is already done (hereinafter called the tagged corpus) and, with the results taken to represent dependencies between the content words contained in each phrase, pairs of words having dependency relations between them are defined in a table. The method is the same as that used in the foregoing embodiment. Next, to cope with a situation in which a word not contained in the corpus is input, the important words are classified. The classification may be done in accordance with a commonly used thesaurus dictionary in such a manner that important words belonging to the same category in the thesaurus are grouped into the same class, but if the input domain can be limited, further optimum classification may be achieved using the following means. First, every important word is classified according to the meaning code in the thesaurus, and this class is taken as the initial class. In the word pairs having the already analyzed dependency relations, any word that is not dependent on the same word as any of the words belonging to the same class is removed from the word class, and such words by themselves are made to form one class. The results of the search conducted on all the word pairs to locate the words to be removed from the class in accordance with the above condition are determined as word classes. When the word classes are thus determined, the word pairs having the previously extracted dependency relations between them are expressed in the form of word class pairs and stored in a table.

When performing recognition, continuous speech recognition and important word extraction are performed in the same manner as in the foregoing embodiment, and by comparing the results against the word class pairs having the already analyzed dependency relations between them, an erroneously recognized word is deduced, and the rejection and the output of a re-entry request are determined.

In this embodiment, the dependency relations between the words are extracted in advance, the words are classified using the thesaurus dictionary and the dependency relations, and the above dependency relations are stored in the table as the dependency relations between the word classes. By comparing the important words contained in the recognition result against the dependency relations between the word classes, erroneously recognized words contained in the recognition result are deduced and, when all or more than a predetermined percentage of the important words in the recognition result are determined as being erroneously recognized words, the recognition result is rejected and the speaker is prompted for a re-entry. Accordingly, in addition to the effect of the foregoing embodiment that enables an erroneous result to be rejected consistently and a re-entry request to be made in an effective manner even if the speaker or the way the voice is uttered changes, the present embodiment offers the effect of being able to perform the above-described processing such as the deduction of erroneously recognized words and the determination of rejection even when an important word not contained in the corpus is input.

In this way, the important words are classified in advance by using the thesaurus dictionary and the corpus, and any erroneously recognized word contained in the recognition result is deduced by using the dependency relations between the important word classes and, when many of the words are deduced as being erroneously recognized words, a re-entry request is made to the user; as a result, even if the speaker or the way the voice is uttered changes, an erroneous result can be rejected consistently and a re-entry request can be made in an effective manner, and furthermore, even if an important word or a sentence expression not contained in the corpus is input, the above described processing such as the deduction of erroneously recognized words and the determination of rejection can be performed.

In the first and second embodiments described above, the threshold for rejection is determined, not based on the recognition score, but based on the naturalness as a sentence of the sentence produced as the recognition result, and the dependency or co-occurrence relations between the specific words contained in the recognition result are examined and, when none of the words have much relevance to each other, the recognition result is rejected; in this way, an erroneous result can be rejected consistently and a re-entry request made in an effective manner even if the speaker or the way the voice is uttered changes.

(Embodiment 3)

Figure 3:
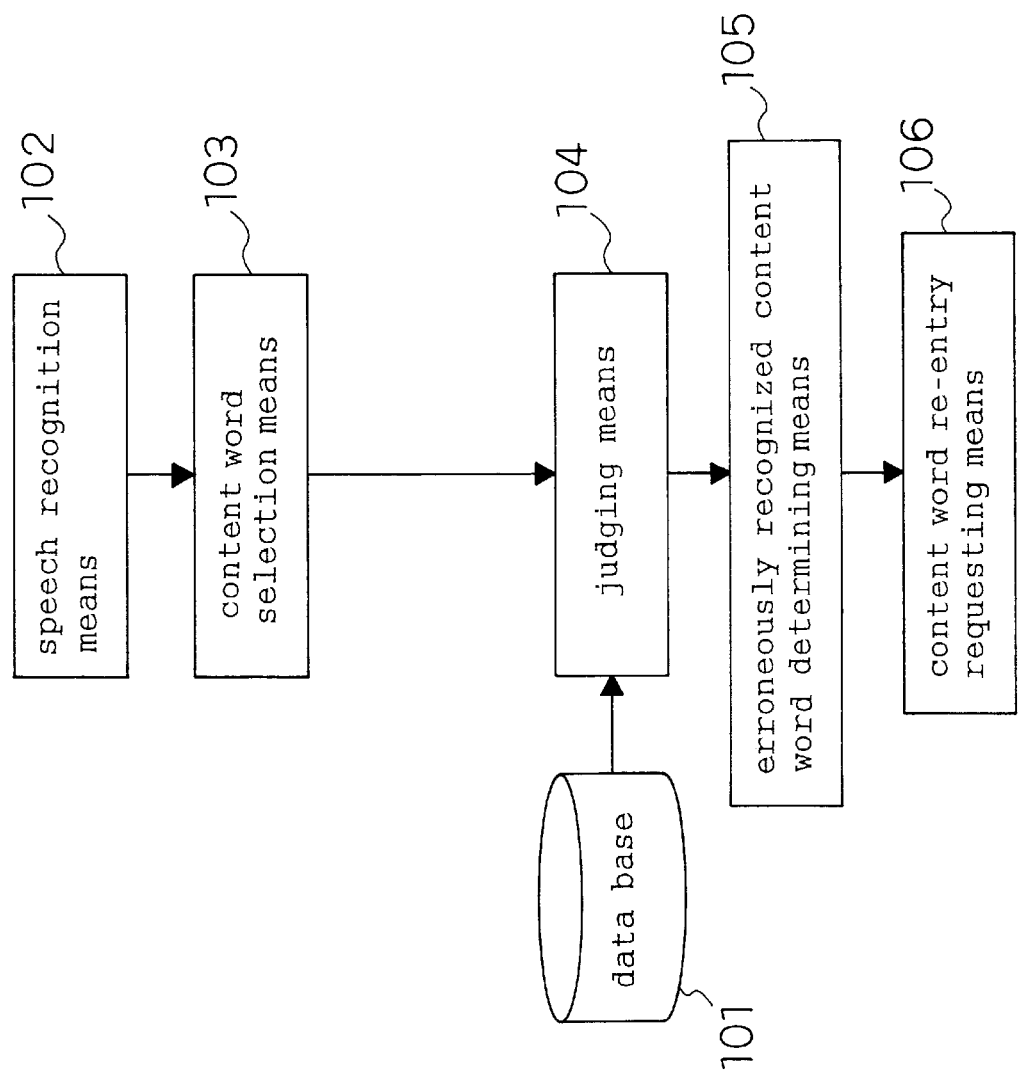
FIG. 3 is a block diagram showing the configuration of a speech recognition apparatus according to a third embodiment of the present invention.

First, referring to FIG. 3 which is a block diagram showing the configuration of a speech recognition apparatus according to a third embodiment of the present invention, the configuration of the speech recognition apparatus according to this embodiment will be described.

The speech recognition apparatus of this embodiment comprises a data base 101, a speech recognition means 102, a content word selection means 103, a judging means 104, an erroneously recognized content word determining means 105, and a content word re-entry requesting means 106.

Here, the data base 101 corresponds to the data base of the present invention, the speech recognition means 102 corresponds to the sentence recognition means of the present invention, the content word selection means 103 corresponds to the specific word selection means of the present invention, the judging means 104 corresponds to the judging means of the present invention, the erroneously recognized content word determining means 105 corresponds to the erroneously recognized specific word determining means of the present invention, the content word re-entry requesting means 106 corresponds to the re-entry requesting means of the present invention, and the speech recognition apparatus of this embodiment corresponds to the sentence recognition apparatus of the present invention. Further, the content word in this embodiment corresponds to the specific word in the present invention.

Next, the configuration of the speech recognition apparatus of the third embodiment will be described in further detail by referring to FIG. 4 which is a diagram for explaining the data stored in the database 101 according to the third embodiment of the present invention.

The data base 101 is a means of storing standard content word pairs, such as 熱い, コーヒー "atsui, koohii"], [コーヒー, 飲む "koohii, nomu)"], etc., each consisting of pre-learned content words and having a predetermined keyword dependency (see FIG. 4).

The speech recognition means 102 is a means of performing speech recognition on a voice input sentence consisting of words.

The content word selection means 103 is a means of selecting content words carried in a content word dictionary (not shown) from among the words forming the sentence produced by speech recognition, by referring to the content word dictionary in which the pre-learned content words are defined.

The judging means 104 is a means of judging whether a content word pair arbitrarily formed by selected content words matches any one of the standard content word pairs stored in the data base 101.

The erroneously recognized content word determining means 105 is a means of determining that a content word is an erroneously recognized content word if the content word is found in two or more content word pairs that have been judged as not matching any of the standard content word pairs stored in the data base 101.

The content word re-entry requesting means 106 is a means of requesting, in the event of occurrence of an erroneously recognized content word, a re-entry of the content word corresponding to the erroneously recognized content word.

Next, the operation of the speech recognition apparatus according to the third embodiment of the present will be described with reference to FIG. 5(a), which is a diagram (part 1) for explaining the operation of the speech recognition apparatus of the third embodiment, and FIG. 5(b), which is a diagram (part 2) for explaining the operation of the speech recognition apparatus of the third embodiment. While explaining the operation of the speech recognition apparatus of this embodiment, one embodiment of a sentence recognition method according to the present invention will also be explained.

The speech recognition means 102 produces a recognized sentence [青いコーヒーを飲みますか。"Aoi koohii wo nomi masu ka?"] by (erroneously) recognizing the voice input sentence [熱いコーヒーを飲みますか。"Atsui koohii wo nomi-masu ka?"].

The content word selection means 103 selects the content words [青い "aoi"], [コーヒー "koohii"], and 「飲む "nomu"」 from the words 「青い "aoi"」, 「コーヒー "koohii"」 を "wo"」, 飲み "nomi"」, 「ます "masu"」, and 「か "ka"」 forming the recognized sentence 「青いコーヒーを飲みますか。 "Aoi koohii wo nomi masu ka?"」 (see FIG. 5(a)) Here, since any conjugated content word is selected by taking its root form (the form appearing as an entry in the dictionary), 「飲み "nomi (conjugated form)"」 has been selected in the form of 「飲む "nomu (root form)"」.

The judging means 104 judges that, of a total of three content word pairs arbitrarily formed from the selected content words, i.e., 「青い, コーヒー "(aoi, kooii)"」, 「青い, 飲む "(aoi, nomu)"」, and 「コーヒー, 飲む "(kooii, nomu)"」, the content word pair 「コーヒー, 飲む "(kooii, nomu)"」 is a standard content word pair stored in the data base 101, and that the content word pairs 「青い, コーヒー "(aoi, kooii)"」 and 「青い, 飲む "(aoi, nomu)"」 are not standard content word pairs stored in the data base 101 (see FIG. 5(b)).

The erroneously recognized content word determining means 105 determines that the content word 「青い "aoi"」 is an erroneously recognized content word, because this content word is found in two or more arbitrarily formed content word pairs, i.e., the arbitrarily formed content word pairs 「青い, コーヒー "(aoi, koohii)"」 and 「青い, 飲む "(aoi, nomu)"」, that have been judged as not matching any of the standard content word pairs stored in the data base 101.

The content word re-entry requesting means 106 requests a re-entry of the content word corresponding to the erroneously recognized content word 「青い "aoi"」.

(Embodiment 4)

Figure 6:
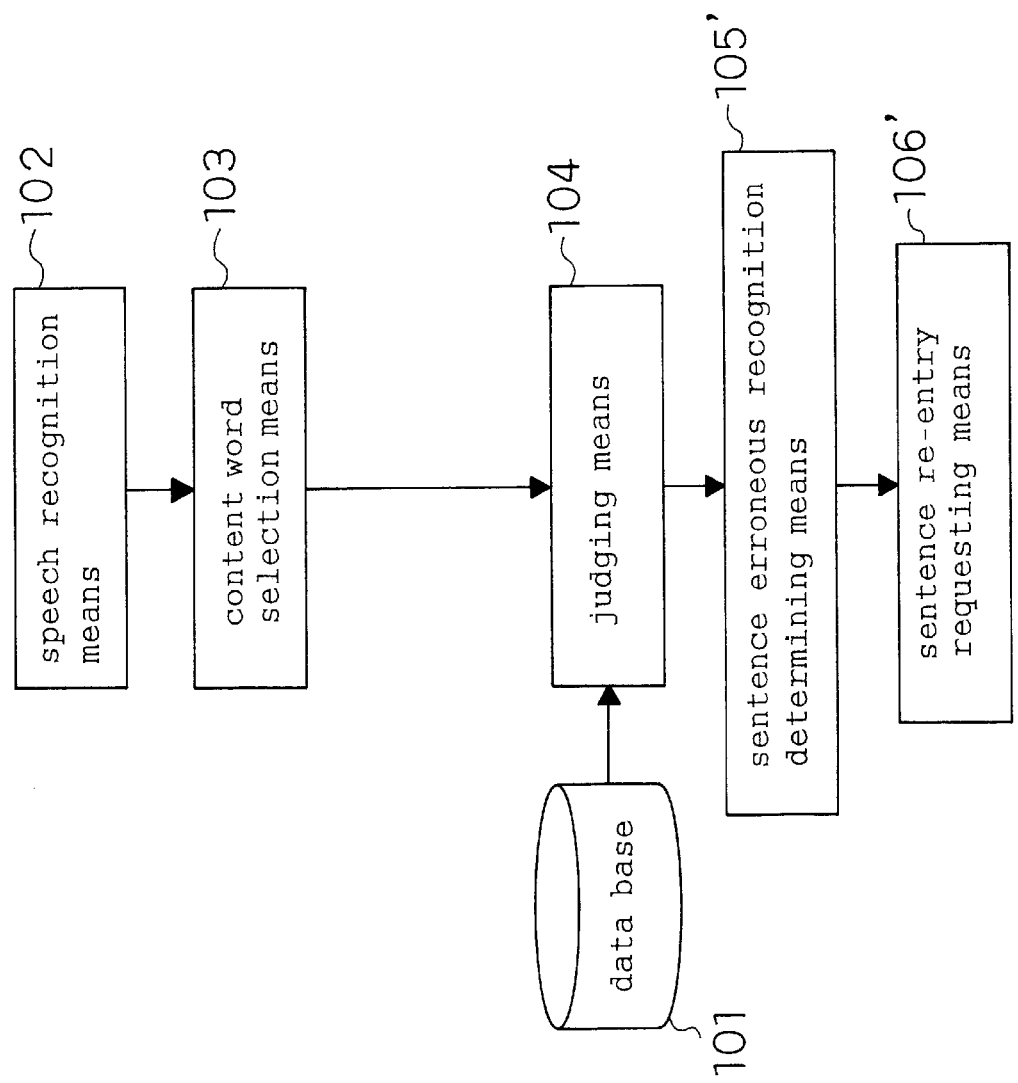
FIG. 6 is a block diagram showing the configuration of a speech recognition apparatus according to a fourth embodiment of the present invention.

First, referring to FIG. 6 which is a block diagram showing the configuration of a speech recognition apparatus according to a fourth embodiment of the present invention, the configuration of the speech recognition apparatus according to this embodiment will be described.

The speech recognition apparatus of this embodiment comprises a data base 101, a speech recognition means 102, a content word selection means 103, a judging means 104, a sentence erroneous recognition determining means 105', and a sentence re-entry requesting means 106'.

Here, the data base 101 corresponds to the data base of the present invention, the speech recognition means 102 corresponds to the sentence recognition means of the present invention, the content word selection means 103 corresponds to the specific word selection means of the present invention, the judging means 104 corresponds to the judging means of the present invention, the sentence erroneous recognition determining means 105' corresponds to the sentence erroneous recognition determining means of the present invention, the sentence re-entry requesting means 106' corresponds to the sentence re-entry requesting means of the present invention, and the speech recognition apparatus of this embodiment corresponds to the sentence recognition apparatus of the present invention. Further, the content word in this embodiment corresponds to the specific word in the present invention.

The speech recognition apparatus of the present embodiment is similar in configuration to the speech recognition apparatus of the foregoing third embodiment, but is characterized by the provision of the sentence erroneous recognition determining means 105' and the sentence re-entry requesting means 106'.

Therefore, the sentence erroneous recognition determining means 105' and the sentence re-entry requesting means 106' will be described in further detail below.

The sentence erroneous recognition determining means 105' is a means of determining that any content word not contained in any one of the arbitrarily formed content word pairs judged to match the standard content word pairs stored in the data base 101 is an erroneously recognized content word, and of determining that the input sentence has been erroneously recognized if the relation $$Y > 0.4 \times X \qquad \text{(Mathematical 1)}$$

holds between the number X of selected content words and the number Y of erroneously recognized content words.

The sentence re-entry requesting means 106' is a means of requesting a re-entry of the input sentence when erroneous recognition has occurred.

Next, the operation of the speech recognition apparatus according to this embodiment will be described. While explaining the operation of the speech recognition apparatus of this embodiment, one embodiment of a sentence recognition method according to the present invention will also be explained.

The speech recognition means 102 produces a recognized sentence 「地元のビールを呼んで池千か。 "Jimoto no biiru wo yon de ike sen ka?"」 by (erroneously) recognizing the voice input sentence 「地元のビールを飲んではいけませんか。 "Jimoto no biiru wo non de wa ike mase n ka?"」.

The content word selection means 103 selects the content words 「地元 "jimoto"」, 「ビール "biiru"」, 「呼ぶ "yobu"」, 「池 "ike"」, and 「千 "sen"」 from the words 「地元 "jimoto"」, 「の "no"」, 「ビール "biiru"」, 「を "wo"」, 「呼ん "yon"」, 「で "de"」, 「池 "ike"」, 「千 "sen"」, and 「か "ka"」 forming the recognized sentence 「地元のビールを呼んで池千か。 "Jimoto no biiru wo yon de ike sen ka?"」. Here, since any conjugated content word is selected by taking its root form (the form appearing as an entry in the dictionary) as in the foregoing third embodiment, 「呼ん "yon (conjugated form)"」 has been selected in the form of 「呼ぶ "yobu (root form)"」.

The judging means 104 judges that, of a total of 60 content word pairs arbitrarily formed from the selected content words, i.e., 「地元, ビール "(jimoto, biiru)"」, 「地元, 呼ぶ "(jimoto, yobu)"」, 「地元, 池 "(jimoto, ike)"」, 「地元, 千 "(jimoto, sen)"」, etc., the content word pair 「地元, ビール "(jimoto, biiru)"」 is a standard content word pair stored in the data base 101, and that the other content word pairs 「地元, 呼ぶ "(jimoto, yobu)"」, 「地元, 池 "(jimoto, ike)"」, 「地元, 千 "(jimoto, sen)"」, etc. are not standard content word pairs stored in the data base 101.

The sentence erroneous recognition determining means 105' determines that the content words 「呼ぶ "yobu"」, 「池 "ike"」, and 「千 "sen"」 none of which are contained in the arbitrarily formed content word pair 「地元, ビール "jimoto, biiru"」 judged to be a standard content word pair stored in the data base 101 are erroneously recognized content words. The sentence erroneous recognition determining means 105' also determines that the input sentence 「地元のビールを飲んではいけませんか。 "Jimoto no biiru wo non de wa ike mase n ka?"」 has been erroneously recognized because the relation (Mathematic 1) holds between the number X of selected content words 「地元 "jimoto"」, 「ビール "biiru"」, 「呼ぶ "yobu"」, 「池 "ike"」, and 「千 "sen"」, which is 5, and the number Y of erroneously recognized content words [呼ぶ "yobu"], [池 "ike"], and [千 "sen"], which is 3.

Then, the sentence re-entry requesting means 106' requests a re-entry of the input sentence [地元のビールを飲んではいけませんか。 "Jimoto no biiru wo non de wa ike mase n ka?"].

(Embodiment 5)

Figure 7:
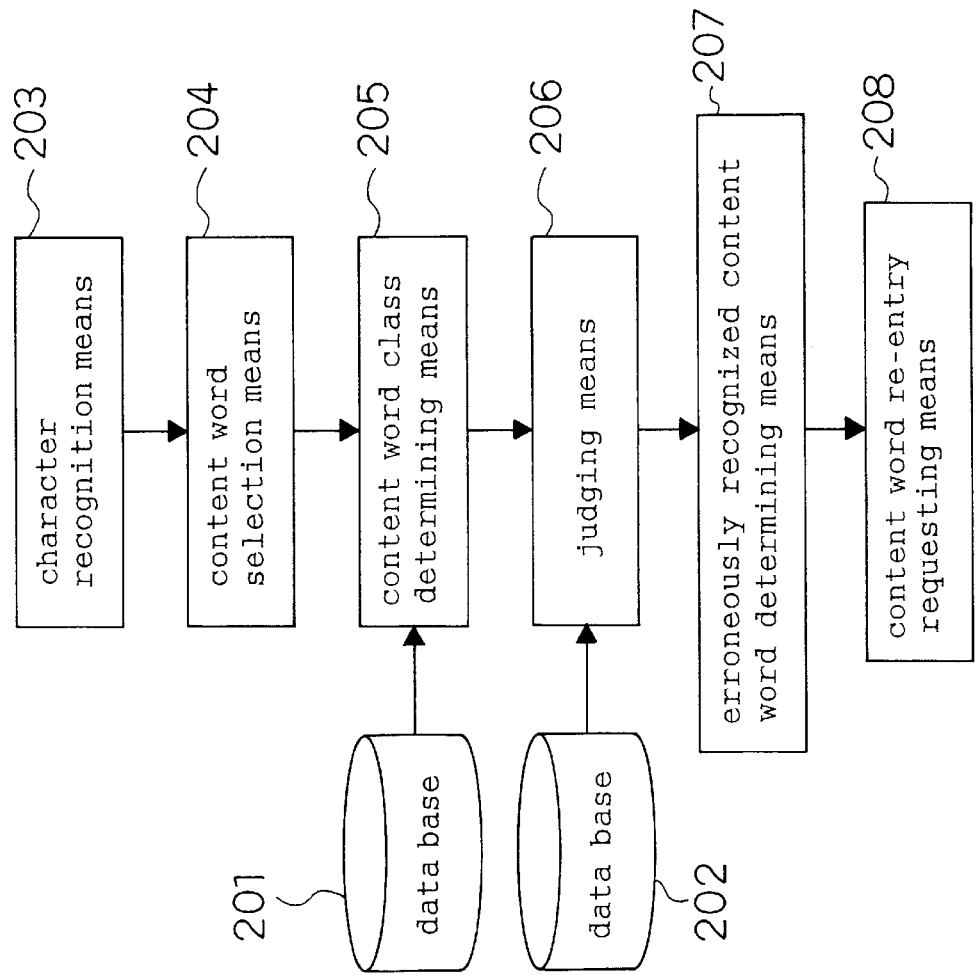
FIG. 7 is a block diagram showing the configuration of a speech recognition apparatus according to a fifth embodiment of the present invention.

First, referring to FIG. 7 which is a block diagram showing the configuration of a character recognition apparatus according to a fifth embodiment of the present invention, the configuration of the character recognition apparatus according to this embodiment will be described.

The character recognition apparatus of this embodiment comprises data bases 201 and 202, a character recognition means 203, a content word selection means 204, a content word class determining means 205, a judging means 206, an erroneously recognized content word determining means 207, and a content word re-entry requesting means 208.

Here, the data base 201 corresponds to the first data base of the present invention, the database 202 corresponds to the second data base of the present invention, the character recognition means 203 corresponds to the sentence recognition means of the present invention, the content word selection means 204 corresponds to the specific word selection means of the present invention, the content word class determining means 205 corresponds to the specific word class determining means of the present invention, the judging means 206 corresponds to the judging means of the present invention, the erroneously recognized content word determining means 207 corresponds to the erroneously recognized specific word determining means of the present invention, the content word re-entry requesting means 208 corresponds to the re-entry requesting means of the present invention, and the character recognition apparatus of this embodiment corresponds to the sentence recognition apparatus of the present invention. Further, the content word in this embodiment corresponds to the specific word in the present invention, and the content word class in this embodiment corresponds to the specific word class in the present invention.

Next, the configuration of the character recognition apparatus of the fifth embodiment will be described in further detail by referring to FIG. 8(a), which is a diagram for explaining the data stored in the data base 201 according to the fifth embodiment of the present invention, and FIG. 8(b), which is a diagram for explaining the data stored in the data base 202 according to the fifth embodiment of the present invention.

The data base 201 is a means of storing correspondences between pre-learned content words and predetermined content word classes to which the content words belong, such as [ビール "biiru 100"], [コーヒー "koohii-100"], [地元 "jimoto-200"], [熱い "atsui-200"], [飲む "nomu-300"], [呼ぶ "yobu-400"], etc. Here, "90" is the meaning code assigned to the content word class corresponding to the category "building", "100" is the meaning code assigned to the content word class corresponding to the category "drink", "200" is the meaning code assigned to the content word class corresponding to the category "property of drink", "300" is the meaning code assigned to the content word class corresponding to the category "action associated with drink", and "400" is the meaning code assigned to the content word class corresponding to the category "action associated with voice".

The data base 202 is a means of storing "(100, 200)", "(100, 300)", etc. as standard content word class pairs consisting of content word classes and having predetermined co-occurrence relations.

The character recognition means 203 is a means of recognizing characters in a sentence consisting of words and input by means of OCR (optical character reader).

The content word selection means 204 is a means of selecting content words carried in a content word dictionary (not shown) from among the words forming the character-recognized sentence, by referring to the content word dictionary in which the pre-learned content words are defined.

The content word class determining means 205 is a means of determining the content word classes to which the selected content words respectively belong, by referring to the correspondences between the content words and content word classes stored in the data base 201.

The judging means 206 is a means of judging whether a content word class pair arbitrarily formed by such determined content word classes matches any one of the standard content word class pairs stored in the data base 202.

The erroneously recognized content word determining means 207 is a means of determining that a content word is an erroneously recognized content word if the content word class to which the content word belongs is found in two or more arbitrarily formed content word class pairs that have been judged as not matching any of the standard content word class pairs stored in the data base 202.

The content word re-entry requesting means 208 is a means of requesting, in the event of occurrence of an erroneously recognized content word, a re-entry of the content word corresponding to the erroneously recognized content word.

Next, the operation of the character recognition apparatus according to the fifth embodiment of the present will be described with reference to FIG. 9(a), which is a diagram (part 1) for explaining the operation of the character recognition apparatus of the fifth embodiment, and FIG. 9(b), which is a diagram (part 2) for explaining the operation of the character recognition apparatusof the fifth embodiment. While explaining the operation of the character recognition apparatus of this embodiment, one embodiment of a sentence recognition method according to the present invention will also be explained.

The character recognition means 203 produces a recognized sentence 地元のビールを呼びますか。 "Jimoto no biiru wo yobi masu ka?"] by (erroneously) recognizing the OCR input sentence [地元のビールを飲みますか。 "Jimoto no biiru wo nomi masu ka?"].

The content word selection means 204 selects the content words [地元 "jimoto"], [ビール "biiru"], and [呼ぶ "yobu"] from the words [地元 "jimoto"], [の "no"], [ビール "biiru"], [を "wo"], [呼び "yobi"], [ます "masu"], and [か "ka"] forming the recognized sentence [地元のビールを呼びますか。 "Jimoto no biiru wo yobi masu ka?"]. Here, since any conjugated content word is selected by taking its root form (the form appearing as an entry in the dictionary) as in the previously described third embodiment, [呼び "yobi (conjugated form)"] has been selected in the form of [呼ぶ "yobu (root form)"].

The content word class determining means 205 determines that the content word classes to which the selected content words [地元 "jimoto"], [ビール "biiru"], and [呼ぶ "yobu"] are "200", "100", and "400", respectively, by referring to the correspondences between the content words and content word classes stored in the data base 201.

The judging means 206 judges that, of a total of three content word class pairs arbitrarily formed from the thus determined content word classes, i.e., "(100, 200)", "(100, 400)", and "(200, 400)", the content word class pair "(100, 200)" is a standard content word class pair stored in the data base 202, and that the content word class pairs "(100, 400)" and "(200, 400)" are not standard content word class pairs stored in the data base 202.

The erroneously recognized content word determining means 207 determines that the content word 「呼ぶ "yobu"」 is an erroneously recognized content word, because the content word class "400" to which this content word belongs is found in two or more arbitrarily formed content word class pairs, i.e., the arbitrarily formed content word class pairs "(100, 400)" and "(200, 400)", that have been judged as not matching any of the standard content word pairs stored in the data base 202.

The content word re-entry requesting means 208 requests a re-entry of the content word corresponding to the erroneously recognized content word 「呼ぶ "yobu"」.

(Embodiment 6)

First, referring to FIG. 10 which is a block diagram showing the configuration of a character recognition apparatus according to a sixth embodiment of the present invention, the configuration of the character recognition apparatus according to this embodiment will be described.

The character recognition apparatus of this embodiment comprises data bases 201 and 202, a character recognition means 203, a content word selection means 204, a content word class determining means 205, a judging means 206, a sentence erroneous recognition determining means 207' and a sentence re-entry requesting means 208'.

Here, the data base 201 corresponds to the first data base of the present invention, the database 202 corresponds to the second data base of the present invention, the character recognition means 203 corresponds to the sentence recognition means of the present invention, the content word selection means 204 corresponds to the specific word selection means of the present invention, the content word class determining means 205 corresponds to the specific word class determining means of the present invention, the judging means 206 corresponds to the judging means of the present invention, the sentence erroneous recognition determining means 207' corresponds to the sentence erroneous recognition determining means of the present invention, the sentence re-entry requesting means 208' corresponds to the sentence re-entry requesting means of the present invention, and the character recognition apparatus of this embodiment corresponds to the sentence recognition apparatus of the present invention. Further, the content word in this embodiment corresponds to the specific word in the present invention, and the content word class in this embodiment corresponds to the specific word class in the present invention.

The character recognition apparatus of this embodiment is similar in configuration to the character recognition apparatus of the foregoing fifth embodiment, but is characterized by the provision of the sentence erroneous recognition determining means 207' and the sentence re-entry requesting means 208'.

Therefore, the sentence erroneous recognition determining means 207' and the sentence re-entry requesting means 208' will be described in further detail below.

The sentence erroneous recognition determining means 207' is a means of determining that any content word not contained in any one of the arbitrarily formed content word class pairs judged to match the standard content word pairs stored in the data base 202 is an erroneously recognized content word, and of determining that the input sentence has been erroneously recognized if the relation $$Y > 0.5 \times X \qquad \text{(Mathematical 2)}$$

holds between the number X of selected content words and the number Y of erroneously recognized content words.

The sentence re-entry requesting means 208' is a means of requesting a re-entry of the input sentence when erroneous recognition has occurred.

Figure 10:
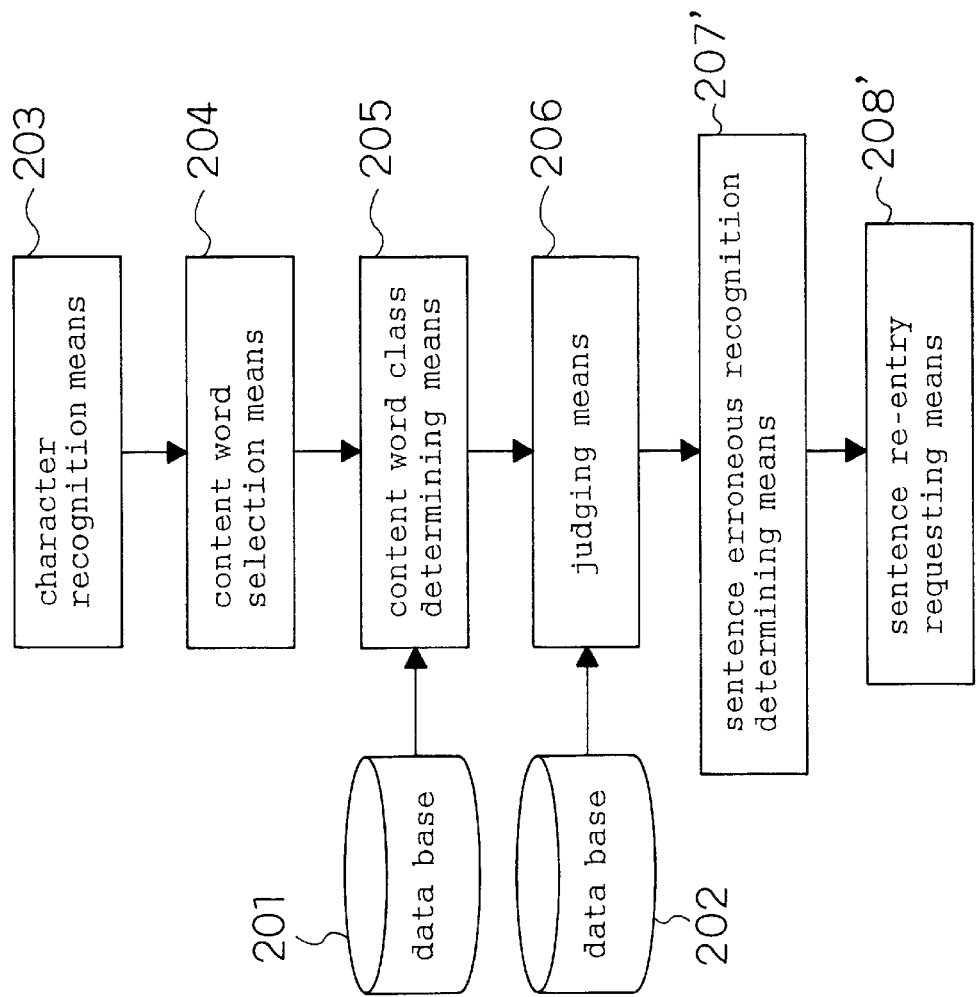
FIG. 10 is a block diagram showing the configuration of a speech recognition apparatus according to a sixth embodiment of the present invention.

Next, the operation of the character recognition apparatus according to the sixth embodiment will be described with reference to the block diagram of FIG. 10 showing the configuration of the character recognition apparatus of the sixth embodiment of the present invention. While explaining the operation of the character recognition apparatus of this embodiment, one embodiment of a sentence recognition method according to the present invention will also be explained.

The character recognition means 203 produces a recognized sentence 「地元のビルを呼びませんか。"Jimoto no biru wo yobi mase n ka?"」by (erroneously) recognizing the OCR input sentence 「地元のビールを飲みませんか。"Jimoto no biiru wo nomi mase n ka?"」.

The content word selection means 204 selects the content words 「地元 "jimoto"」, 「ビル "biru"」, and 「呼ぶ "yobu"」 from the words 「地元 "jimoto"」, 「の "no"」, 「ビル "biru"」, 「を "wo"」, 「呼び "yobi"」, 「ませ "mase"」, 「ん "n"」, and 「か "ka"」 forming the recognized sentence 「地元のビルを呼びませんか。"Jimoto no biru wo yobi mase n ka?"」. Here, since any conjugated content word is selected by taking its root form (the form appearing as an entry in the dictionary) as in the previously described third embodiment, 「呼び "yobi (conjugated form)"」 has been selected in the form of 「呼ぶ "yobu (root form)"」.

The content word class determining means 205 determines that the content word classes to which the selected content words 「地元 "jimoto"」, 「ビル "biru"」, and 「呼ぶ "yobu"」are "200", "90", and "400", respectively, by referring to the correspondences between the content words and content word classes stored in the data base 201.

The judging means 206 judges that, of a total of three content word class pairs arbitrarily formed from the thus determined content word classes, i.e., "(90, 200)", "(90, 400)", and "(200, 400)", there are none that match the standard content word class pairs stored in the data base 202.

The sentence erroneous recognition determining means 207' determines that all the selected content words 「地元 "jimoto"」, 「ビル "biru"」, and 「呼ぶ "yobu"」 are erroneously recognized content words. The sentence erroneous recognition determining means 207' also determines that the input sentence 「地元のビールを飲んではいけませんか。"Jimoto no biiru wo non de wa ike mase n ka?"」 has been erroneously recognized, because the relation (Mathematic 2) holds between the number X of selected content words 「地元 "jimoto"」, 「ビル "biru"」, and 「呼ぶ "yobu"」, which is 3, and the number Y of erroneously recognized content words 「地元 "jimoto"」, 「ビル "biru"」, and 「呼ぶ "yobu"」, which is 3.

Then, the sentence re-entry requesting means 208' requests a re-entry of the input sentence 「地元のビールを飲みませんか。"Jimoto no biiru wo nomi mase n ka?"」.

The first to sixth embodiments have been described in detail above.

In the third and fifth embodiment described above, when there was an erroneously recognized specific word, the re-entry requesting means of the present invention requested a re-entry of the specific word corresponding to the erroneously recognized specific word, but alternatively, in the event of occurrence of an erroneously recognized specific word, a re-entry of the input sentence, for example, may be requested.

Of course, a notifying means may be provided that notifies the user of the occurrence of an erroneously recognized specific word (erroneous recognition). For example, a message such as "The name (or a portion of the name) could not be heard" may be present to the user by a voice or text; in that case also, an effect similar to the re-entry request can be achieved.

The invention includes a program for causing a computer to carry out the functions of all or part of the means (or devices, elements, circuits, blocks, etc.) of the sentence recognition apparatus of the invention described above, wherein the program operates in collaboration with the computer. Of course, the computer here is not limited to pure hardware such as a CPU, but may further include firmware, an OS, or even a peripheral device.

The invention also includes a program for causing a computer to carry out the operations in all or part of the steps (or processes, operations, effects, etc.) of the sentence recognition method of the invention described above, wherein the program operates in collaboration with the computer.

Here, part of the means (or devices, elements, circuits, blocks, etc.) of the invention and part of the steps (or processes, operations, effects, etc.) of the invention refer to some of the plurality of means or steps, or some of the functions or operations in one of the means or steps.

Further, some of the devices (or elements, circuits, blocks, etc.) of the invention refer to some of the plurality of devices, or some of the means (or elements, circuits, blocks, etc.) in one of the devices, or some of the functions in one of the means.

A computer readable recording medium with the program of the invention recorded thereon is also included in the present invention. In one utilization mode of the program of the invention, the program is recorded on a recording medium readable by a computer, and is operated in collaboration with the computer. In another utilization mode of the program of the invention, the program is transmitted through a transmission medium, is read by a computer, and is operated in collaboration with the computer. The recording medium includes a ROM or the like, and the transmission medium includes a transmission medium such as the Internet, light waves, radio waves, or sound waves.

The configuration of the invention may be implemented in software or in hardware.

The invention also includes a medium having a program recorded thereon for causing a computer to carry out all or some of the functions of all or some of the means of the sentence recognition apparatus of the invention described above, wherein the program readable by the computer is read by the computer and carries out the functions in collaboration with the computer.

The invention further includes a medium having a program recorded thereon for causing a computer to carry out all or some of the operations in all or some of the steps of the sentence recognition method of the invention described above, wherein the program readable by the computer is read by the computer and carries out the operations in collaboration with the computer.

The entire disclosure of the above literature is incorporated herein by reference in its entirety.

Potential for Exploitation in Industry

As is apparent from the above description, the present invention has the advantage of being able to perform proper sentence recognition by using speech recognition or text sentence recognition.

What is claimed is:

1. A sentence recognition apparatus comprising:

a data base for storing a plurality of predetermined standard specific word pairs each formed from a plurality of predetermined specific words;

sentence recognition means of recognizing an input sentence made up of a plurality of words;

specific word selection means of selecting said specific words from among the plurality of words forming said recognized sentence;

judging means of judging whether a specific word pair arbitrarily formed from said selected specific words matches any one of the standard specific word pairs stored in said data base; and erroneously recognized specific word determining means of determining, based on the result of said judgement, an erroneously recognized specific word for which said recognition failed from among said selected specific words.

2. A sentence recognition apparatus as set forth in claim 1, wherein said erroneously recognized specific word determining means determines a specific word as being said erroneously recognized specific word if said specific word is found in more than a predetermined number of arbitrarily formed specific word pairs that have been judged as not matching any of the standard specific word pairs stored in said data base.

3. A sentence recognition apparatus as set forth in claim 1 or 2, further comprising re-entry requesting means of requesting, in the event of occurrence of said erroneously recognized specific word, (1) a re-entry of the specific word corresponding to said erroneously recognized specific word or (2) a re-entry of said input sentence.

4. A sentence recognition apparatus as set forth in claim 1 or 2, further comprising notifying means of notifying a user of the occurrence of said erroneously recognized specific word when said erroneously recognized specific word does occur.

5. A sentence recognition apparatus comprising:

a data base for storing a plurality of predetermined standard specific word pairs each formed from a plurality of predetermined specific words;

sentence recognition means of recognizing an input sentence made up of a plurality of words;

specific word selection means of selecting said specific words from among the plurality of words forming said recognized sentence;

judging means of judging whether a specific word pair arbitrarily formed from said selected specific words matches any one of the standard specific word pairs stored in said data base; and sentence erroneous recognition determining means of determining, based on the result of said judgement, whether said input sentence has been erroneously recognized or not.

6. A sentence recognition apparatus as set fourth in claim 5, further comprising sentence re-entry requesting means of requesting a re-entry of said input sentence in the event of occurrence of said erroneous recognition.

7. A sentence recognition apparatus as set fourth in claim 5, further comprising notifying means of notifying a user of the occurrence of said erroneous recognition when said erroneous recognition does occur.

8. A sentence recognition apparatus comprising:
- a first data base for storing correspondences between a plurality of predetermined specific words and a plurality of specific word classes to which said specific words belong;
- a second data base for storing a plurality of predetermined standard specific word class pairs each formed from two of said predetermined specific word classes;
- sentence recognition means of recognizing an input sentence made up of a plurality of words;
- specific word selection means of selecting said specific words from among the plurality of words forming said recognized sentence;
- specific word class determining means of determining, by utilizing the correspondences stored in said first data base, the specific word classes to which said selected specific words respectively belong;
- judging means of judging whether a specific word class pair arbitrarily formed from said determined specific word classes matches any one of the standard specific word class pairs stored in said second data base; and
- erroneously recognized specific word determining means of determining, based on the result of said judgement, an erroneously recognized specific word for which said recognition failed from among said selected specific words.

9. A sentence recognition apparatus as set forth in claim 8, wherein said erroneously recognized specific word determining means determines a specific word as being said erroneously recognized specific word if the specific word class to which said specific word belongs is found in more than a predetermined number of arbitrarily formed specific word class pairs that have been judged as not matching any of the standard specific word class pairs stored in said second data base.

10. A sentence recognition apparatus as set forth in claim 8 or 9, further comprising re-entry requesting means of requesting, in the event of occurrence of said erroneously recognized specific word, (1) a re-entry of the specific word corresponding to said erroneously recognized specific word or (2) a re-entry of said input sentence.

11. A sentence recognition apparatus as set forth in claim 8 or 9, further comprising notifying means of notifying a user of the occurrence of said erroneously recognized specific word when said erroneously recognized specific word does occur.

12. A sentence recognition apparatus comprising:
- a first data base for storing correspondences between a plurality of predetermined specific words and a plurality of specific word classes to which said specific words belong;
- a second data base for storing a plurality of predetermined standard specific word class pairs each formed from two of said predetermined specific word classes;
- sentence recognition means of recognizing an input sentence made up of a plurality of words;
- specific word selection means of selecting said specific words from among the plurality of words forming said recognized sentence;
- specific word class determining means of determining, by utilizing the correspondences stored in said first data base, the specific word classes to which said selected specific words respectively belong;
- judging means of judging whether a specific word class pair arbitrarily formed from said determined specific word classes matches any one of the standard specific word class pairs stored in said second data base; and
- sentence erroneous recognition determining means of determining, based on the result of said judgement, whether said input sentence has been erroneously recognized or not.

13. A sentence recognition apparatus as set fourth in claim 12, further comprising sentence re-entry requesting means of requesting a re-entry of said input sentence in the event of occurrence of said erroneous recognition.

14. A sentence recognition apparatus as set fourth in claim 12, further comprising notifying means of notifying a user of the occurrence of said erroneous recognition when said erroneous recognition does occur.

15. A sentence recognition method comprising the steps of:
- storing in a data base a plurality of predetermined standard specific word pairs each formed from a plurality of predetermined specific words;
- recognizing an input sentence made up of a plurality of words;
- selecting said specific words from among the plurality of words forming said recognized sentence;
- judging whether a specific word pair arbitrarily formed from said selected specific words matches any one of the standard specific word pairs stored in said data base; and
- determining, based on the result of said judgement, an erroneously recognized specific word for which said recognition failed from among said selected specific words.

16. A program for causing a computer to carry out all or part of the steps in the sentence recognition method of claim 15, said steps comprising: storing in a data base a plurality of predetermined standard specific word pairs each formed from a plurality of predetermined specific words; recognizing an input sentence made up of a plurality of words; selecting said specific words from among the plurality of words forming said recognized sentence; judging whether a specific word pair arbitrarily formed from said selected specific words matches any one of the standard specific word pairs stored in said data base; and determining, based on the result of said judgement, an erroneously recognized specific word for which said recognition failed from among said selected specific words.

17. A medium holding thereon the program of claim 16, wherein said medium is computer processable.

18. A sentence recognition method comprising the steps of:
- storing in a data base a plurality of predetermined standard specific word pairs each formed from a plurality of predetermined specific words;
- recognizing an input sentence made up of a plurality of words;
- selecting said specific words from among the plurality of words forming said recognized sentence;
- judging whether a specific word pair arbitrarily formed from said selected specific words matches any one of the standard specific word pairs stored in said data base; and determining, based on the result of said judgement, whether said input sentence has been erroneously recognized or not.

19. A program for causing a computer to carry out all or part of the steps in the sentence recognition method of claim 18, said steps comprising: storing in a data base a plurality of predetermined standard specific word pairs each formed from a plurality of predetermined specific words; recognizing an input sentence made up of a plurality of words; selecting said specific words from among the plurality of words forming said recognized sentence; judging whether a specific word pair arbitrarily formed from said selected specific words matches any one of the standard specific word pairs stored in said data base; and determining, based on the result of said judgement, whether said input sentence has been erroneously recognized or not.

20. A medium holding thereon the program of claim 19, wherein said medium is computer processable.

21. A sentence recognition method comprising the steps of:

storing, in a first data base, correspondences between a plurality of predetermined specific words and a plurality of specific word classes to which said specific words belong;

storing in a second data base a plurality of predetermined standard specific word class pairs each formed from two of said predetermined specific word classes;

recognizing an input sentence made up of a plurality of words;

selecting said specific words from among the plurality of words forming said recognized sentence;

determining, by utilizing the correspondences stored in said first data base, the specific word classes to which said selected specific words respectively belong;

judging whether a specific word class pair arbitrarily formed from said determined specific word classes matches any one of the standard specific word class pairs stored in said second data base; and determining, based on the result of said judgement, an erroneously recognized specific word for which said recognition failed from among said selected specific words.

22. A program for causing a computer to carry out all or part of the steps in the sentence recognition method of claim 21, said steps comprising: storing, in a first data base, correspondences between a plurality of predetermined specific words and a plurality of specific word classes to which said specific words belong; storing in a second data base a plurality of predetermined standard specific word class pairs each formed from two of said predetermined specific word classes; recognizing an input sentence made up of a plurality of words; selecting said specific words from among the plurality of words forming said recognized sentence; determining, by utilizing the correspondences stored in said first data base, the specific word classes to which said selected specific words respectively belong; judging whether a specific word class pair arbitrarily formed from said determined specific word classes matches any one of the standard specific word class pairs stored in said second data base; and the erroneously recognized specific word determining step of determining, based on the result of said judgement, an erroneously recognized specific word for which said recognition failed from among said selected specific words.

23. A medium holding thereon the program of claim 22, wherein said medium is computer processable.

24. A sentence recognition method comprising the steps of:

storing, in a first data base, correspondences between a plurality of predetermined specific words and a plurality of specific word classes to which said specific words belong;

storing in a second data base a plurality of predetermined standard specific word class pairs each formed from two of said predetermined specific word classes;

recognizing an input sentence made up of a plurality of words;

selecting said specific words from among the plurality of words forming said recognized sentence;

determining, by utilizing the correspondences stored in said first data base, the specific word classes to which said selected specific words respectively belong;

judging whether a specific word class pair arbitrarily formed from said determined specific word classes matches any one of the standard specific word class pairs stored in said second data base; and determining, based on the result of said judgement, whether said input sentence has been erroneously recognized or not.

25. A program for causing a computer to carry out all or part of the steps in the sentence recognition method of claim 24, said steps comprising: storing, in a first data base, correspondences between a plurality of predetermined specific words and a plurality of specific word classes to which said specific words belong; storing in a second data base a plurality of predetermined standard specific word class pairs each formed from two of said predetermined specific word classes; recognizing an input sentence made up of a plurality of words; selecting said specific words from among the plurality of words forming said recognized sentence; determining, by utilizing the correspondences stored in said first data base, the specific word classes to which said selected specific words respectively belong; judging whether a specific word class pair arbitrarily formed from said determined specific word classes matches any one of the standard specific word class pairs stored in said second data base; and determining, based on the result of said judgement, whether said input sentence has been erroneously recognized or not.

26. A medium holding thereon the program of claim 25, wherein said medium is computer processable.

* * * * *